United States Patent
McLaughlin et al.

[11] Patent Number: 5,298,050
[45] Date of Patent: Mar. 29, 1994

[54] HIGH WATER SOLUBILITY POTASSIUM SULFATE AND METHOD OF PRODUCING SAME

[75] Inventors: J. C. McLaughlin, Brigham, Utah; Danton S. Nason; John R. Prest, Jr., both of Overland Park, Kans.

[73] Assignee: Great Salt Lake Minerals Corporation, Overland Park, Kans.

[21] Appl. No.: 959,111

[22] Filed: Oct. 9, 1992

[51] Int. Cl.$^5$ .................. C01D 5/00; C05D 1/00; C05D 1/02

[52] U.S. Cl. ............................ 71/63; 71/64.1; 423/274; 423/551

[58] Field of Search .............. 423/551, 274; 71/63, 71/64.1

[56] References Cited

U.S. PATENT DOCUMENTS

| | | |
|---|---|---|
| 2,720,446 | 10/1955 | Whetstone et al. |
| 3,186,828 | 6/1965 | Baarson et al. |
| 3,230,038 | 1/1966 | Wilson |
| 3,620,709 | 11/1971 | Petkovsek .............. 71/63 |
| 3,843,772 | 10/1974 | Boeglin |
| 4,252,735 | 2/1981 | Layer et al. |
| 4,308,031 | 12/1981 | Au |
| 4,381,782 | 5/1983 | Mazurak et al. |
| 4,562,058 | 12/1985 | Dancy et al. |
| 4,673,410 | 6/1987 | Sandefur et al. |
| 4,738,925 | 4/1988 | Ananthapadmanabhan et al. |
| 4,803,058 | 2/1989 | Highfill |
| 5,071,633 | 12/1991 | de Haan et al. |
| 5,075,086 | 12/1991 | Burton et al. |

FOREIGN PATENT DOCUMENTS

| | | | |
|---|---|---|---|
| 1057072 | 5/1959 | Fed. Rep. of Germany | 423/551 |
| 251124 | 12/1984 | Japan | 423/551 |
| 827392 | 5/1981 | U.S.S.R. | 423/551 |

OTHER PUBLICATIONS

Olin Surfactants Product Data No. 721-044R; Jun. 1991.
Olin Corporation Material Safety Data Sheet; Poly-Tergent(R) 3B2; Sep. 4, 1992.
Olin Material Safety Data Sheet; Poly-Tergent(R) 2A1-L; Dec. 27, 1990.
Olin Surfactants Product Data No. 721-046; Apr. 1988.
Olin Organic Chemicals Product Data No. 721-022R3; Sep. 1988.
Olin Surfactants Product Data No. 721-53R Jun. 1991.
Olin Material Safety Data; Polycarboxylated Surfactant; Aug. 14, 1990.
Olin Surfactants Product Data No. 721-045R, Sep. 1990.
Great Salt Lake Minerals Corporation Brochure; Apr. 1, 1992.

*Primary Examiner*—Wayne Langel
*Attorney, Agent, or Firm*—Hovey, Williams, Timmons & Collins

[57] ABSTRACT

Improved potassium sulfate salt products in both solid particulate and liquid form are provided which exhibit enhanced salt solubility in water. The products include potassium sulfate, in combination with a surfactant and mixed together in water. The aqueous mixture is heated to a maximum reaction temperature in the range of about 100°–210° F., and will retain enhanced water solubility in either a heated or cooled condition. In preferred forms, potassium sulfate may be treated with at least 0.1% by weight of disulfonate surfactant and heated in water to 100°–140° F. to give $K_2SO_4$ solutions of at least 8% by weight solubility taken as $K_2O$.

29 Claims, 1 Drawing Sheet

HIGH WATER SOLUBILITY POTASSIUM SULFATE AND METHOD OF PRODUCING SAME

BACKGROUND OF THE INVENTION

1. Field of the Invention

The present invention is broadly concerned with improved potassium sulfate salt products having enhanced water solubility permitting them to be used with greater efficiency as liquid, spray-on fertilizer products. More particularly, it is concerned with such improved potassium products, as well as a method of producing the same, wherein potassium sulfate is mixed with water and an appropriate surfactant and optional defoamer and subjected to heating to a temperature of from about 100°–210° F.; the solution, when cooled, exhibits a significantly increased potassium sulfate solubility as compared with untreated potassium sulfate solutions.

2. Description of the Prior Art

Potassium sulfate, potassium chloride and potassium nitrate are all used as fertilizer products to a greater or lesser degree. Potassium chloride is the most widely used potassium salt, but is inapplicable for chloride and/or salt-sensitive crops such as tobacco, fruits, vegetables and turfs. However, KCl has a significant water solubility on the order of 14–16% as $K_2O$, and therefore this salt is often applied as a liquid.

Potassium sulfate (commonly referred to in the trade as sulfate of potash or SOP) is a premium fertilizer product. Certain grades of SOP, particularly those manufactured from the brine of the Great Salt Lake, are especially valuable products because they are essentially free of chlorides. Therefore, such products are admirably suited for use on chloride and/or salt-sensitive crops and the like. A drawback of SOP, however, is that in its natural state it is significantly less soluble in water than KCl, having an ambient temperature solubility of about 4–6% by weight as $K_2O$. This relatively low water solubility has inhibited the use of $K_2SO_4$ as a liquid fertilizer product, despite its otherwise significant advantages.

Potassium nitrate is more soluble than SOP, normally about 9–11% by weight as $K_2O$, but is a very expensive product as compared with KCl or $K_2SO_4$. Nevertheless, it has achieved some commercial utility as a liquid fertilizer source, owing at least in part to its low salt index.

It will of course be appreciated that enhancement of the solubility of potassium sulfate salts would represent a significant advance. Such an improvement would mean that more concentrated solutions could be prepared and applied, thereby lessening preparation, storage and transportation costs associated with the liquids.

SUMMARY OF THE INVENTION

The present invention overcomes the problems outlined above, and provides improved potassium sulfate products (both solids and liquids) which exhibit materially improved water solubilities. Broadly, the potassium sulfate products of the invention are supplemented with an appropriate surfactant and optional defoamer. In preparative procedures, the potassium sulfate and surfactant are present in a water solution, and the mixture is heated to a temperature in the range of from about 100°–210° F.

In one aspect of the invention, a particulate potassium sulfate product is provided which includes potassium sulfate, with a surfactant and optional defoamer applied onto the surface thereof for increasing the solubility of the resultant product in water. This surfactant is present at a level of at least about 0.1% by weight, more preferably at least 0.25% by weight, and most preferably from about 0.30–0.50% by weight, based upon the weight of the nominally dry potassium sulfate. It will be appreciated in this respect that a substantial excess of surfactant could be employed without detracting from the water solubility of the potassium sulfate; however, this is disfavored from an economic standpoint.

The preferred surfactants for use in the invention are selected from the group consisting of the disulfonate and oxyalkylated alcohol-carboxylic acid adduct surfactants. In the former class, the alkyl diphenyl ether disulfonates are preferred, wherein the alkyl group contains from about 8–22 carbon atoms, and more particularly from about 10–18 carbon atoms. Moreover, the alkyl group of the disulfonate is preferably linear. The second class of preferred surfactants are those selected from the group consisting of surfactants having the general formula

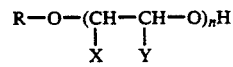

wherein R is a $C_8$–$C_{22}$ hydrophobe, X and Y are individually selected from the group consisting of H, $CH_3$ and a succinic acid radical, and n ranges from about 1–8. Particularly preferred are the succinic acid derivatives wherein the hydrophobe has a carbon number of from about 9–16.

In a related aspect of the invention, aqueous potassium sulfate solutions are provided which comprise water, dissolved potassium sulfate and a surfactant of the type and in the amounts described previously; a defoamer may also optionally be used.

The method of increasing solubility of the invention comprises the steps of mixing together water, one or more of the recited potassium sulfate, and a surfactant and optional defoamer of the types and amounts specified in connection with the particulate products. The mixture is then heated to an elevated reaction temperature of from about 100°–210° F., preferably with agitation or stirring. In this respect, it has been found that increasing the reaction temperature has a positive effect upon solubility. However, for overall reasons of ease of processing and handling, and fuel economy, it is believed that a $K_2SO_4$ solution having ≧8% solubility as $K_2O$ is commercially feasible. These types of solutions can readily be produced using a maximum reaction temperature on the order of 100°–140° F.

After the maximum reaction temperature is achieved, it may be held at this maximum temperature for a short time (e.g., 5 minutes) whereupon the solution is allowed to cool, again with at least occasional agitation or stirring, to approximately room temperature (i.e., 68°–75° F.).

It has been discovered that potassium sulfate particulates (preferably having a size range of Tyler mesh 48–150) can be sprayed with one or more of the preferred surfactants (and optionally a defoamer) at the indicated levels without extended drying, and that this product can be appropriately stored and shipped to a remote location in proximity to a point of use. Thereupon, the potassium sulfate/surfactant product can be dissolved in hot water, or placed in cold water and heated to a minimum reaction temperature and cooled to about ambient. This liquid is then eminently suited for spray application onto a crop or turf grass, or direct application to the soil. The dissolved salt content as $K_2O$ will not significantly decrease over time, and no salting out or precipitation should occur. To give one specific example, a 100 pound sample of $K_2SO_4$ can be sprayed with 0.4% by weight of a preferred disulfonate surfactant, which will adequately adhere to the $K_2SO_4$ without drying or other steps. This amount of SOP can then be dissolved in 66 gallons of water and heated to a temperature of 110°–120° F. The product will then have a minimum of 8% solubility as $K_2O$, with a surfactant content on the order of 615 ppm.

DETAILED DESCRIPTION OF THE REFERRED EMBODIMENTS

Figure 1:
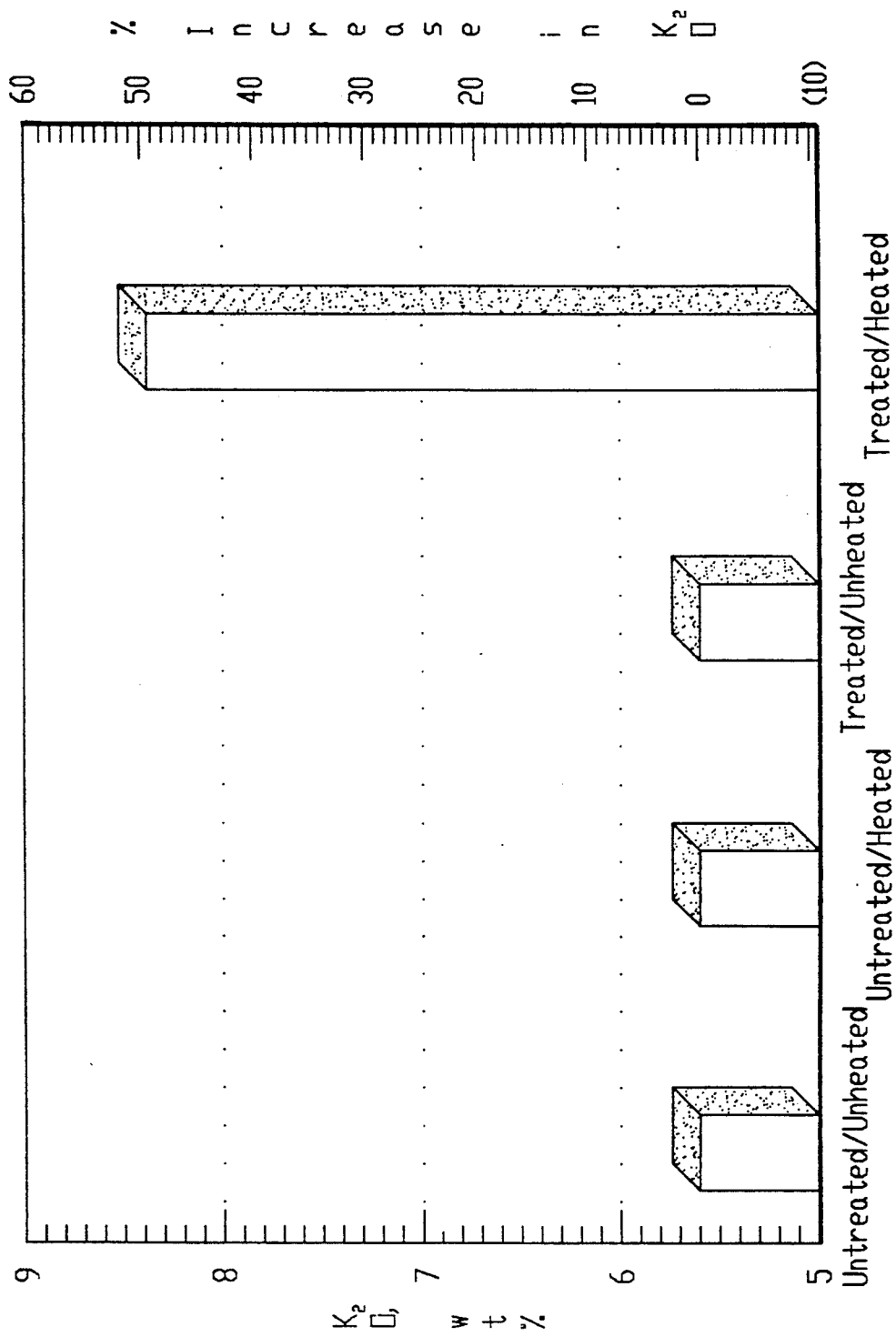
FIG. 1 is a graphical representation illustrating comparative tests with $K_2SO_4$, and showing the effect of treating the potassium sulfate with surfactant in water, followed by heating.

As indicated above, one preferred class of surfactants for use in the present invention is the disulfonates, and particularly the alkyl diphenyl ether disulfonates. Two particular products which have been found to be useful are the Poly-Tergent 2A1-L anionic surfactant and the Poly-Tergent 3B2 anionic surfactant, both of which are commercialized by Olin Chemicals of Stamford, Cont.

The 2A1-L surfactant is a linear dodecyl diphenyl ether sodium disulfonate, having a freezing point of 32° F., a boiling of 212° F., a specific gravity of 1.16, a bulk density of 9.15 lb/gal., a pH at 25° C. of greater than 9, and a vapor pressure at 25° C. of 23.7 mm Hg. This product is further defined in an Olin Product Data Sheet entitled "Poly-Tergent 2A1 Acid and Poly-Tergent 2A1 Anionic Surfactant", and the associated Material Safety Data Sheets, all of which are incorporated by reference herein.

The Poly-Tergent 3B2 anionic surfactant is a decyl diphenyl ether sodium disulfonate having essentially the same physical properties as the 2A1-L surfactant. The 3B2 surfactant is described in an Olin Product Data Sheet entitled "Poly-Tergent 3B2 Acid and Poly-Tergent 3B2 Anionic Surfactant", and the associated Material Safety Data Sheets; these publications are incorporated by reference herein.

Another disulfonate of interest is the Poly-Tergent 4C3 anionic surfactant commercialized by Olin Chemical. This is the sodium salt of hexadecyl diphenyl ether disulfonic acid. Its physical data vary slightly as compared with the 2A1-L and 3B2 surfactants. This product is described in an Olin Product Data Sheet entitled "Poly-Tergent 4C3 Anionic Surfactant" and the related Material Safety Data Sheets, and these materials are incorporated by reference herein.

One type of the oxyalkylated alcohol-carboxylic acid adduct surfactants preferred for use in the invention is the Poly-Tergent C-series surfactants commercialized by Olin Chemical. This series is a family of 9 polycarboxylated surfactants having the formula described previously. Particularly preferred members of this class are the succinic acid derivative products, with hydrophobes having an average carbon length ranging from $C_9$–$C_{16}$. This class of surfactants is described in an Olin Product Data Sheet entitled "Poly-Tergent C-Series Polycarboxylated Multi-functional Surfactants", and the related Material Safety Data Sheets, all of which are incorporated by reference herein.

In some instances, it may be advisable to add a very minor amount of a defoamer to the potassium sulfate salt products of the invention, in order to minimize foaming during heating and stirring. One suitable defoamer is a product commercialized under the name "Foam Ban Co" by Ultra Additives, Inc. of Patterson, N.J. This proprietary product contains polyalkylene glycol as well as an oxyalkylene polymer, and is known to be useful as an anti-foam/defoamer agent.

The potassium sulfate of the invention can be derived from virtually any commercial source. However, use of the Soluble Fine grade of potassium sulfate sold by Great Salt Lake Minerals Corporation is particularly preferred. This material is in itself a premium product, which is free of KCl. Therefore, this $K_2SO_4$ is especially suited for applications where significant chloride ion cannot be tolerated.

The following examples are illustrative of the present invention. It should be understood, however, that these examples are to be taken by way of illustration only, and nothing therein should be considered as a limitation upon the overall scope of the invention.

EXAMPLE 1

In this series of tests, samples of reagent grade $K_2SO_4$ were treated with surfactant alone and in the presence of certain additional salts, in order to determine the resulting enhancement in $K_2SO_4$ solubility. In each test, a quantity of water was mixed with 1.2 g of the previously described Poly-Tergent 2A1-L surfactant along with an appropriate amount of $K_2SO_4$, and in certain cases $MgSO_4$, $MgCl_2$ $6H_2O$, $Na_2SO_4$, NaCl and KCl. The ingredients were then mixed and heated to a maximum temperature and held for 5 minutes. The mixture was then allowed to cool with stirring to approximately 70°–72° F., whereupon the mixture was filtered and the liquor was analyzed for salt and ingredient content. The respective liquors were then cooled in a refrigerator over a weekend to a temperature of about 35°–37° F., stirred several times and then filtered. The secondary filtrates were then tested for salt and ingredient content.

In Run #1, the surfactant was mixed with 830 g of water and 300 g $K_2SO_4$. This mixture was heated to 192° F. and held for 5 minutes, whereupon it was first-stage cooled with stirring to 71° F., filtered and analyzed. The recovered liquor was then second-stage cooled (refrigerated) as described previously to 35° F., stirred, refiltered and again analyzed. A 30 ml portion of the final refiltered liquor was diluted with 200 ml of water and the pH was measured.

All of the succeeding runs were carried out as described, with the following changes in ingredients and processing parameters.

Run #2: 861 g water, 200 g $K_2SO_4$, and 70 g $MgSO_4$; maximum heating temperature was 192° F. and first-stage cooling was carried out to a temperature of 72° F., and second-stage cooling to 35° F.

Run #3: 813 g water, 200 g $K_2SO_4$, 118 g $MgCl_2 6H_2O$; maximum heating temperature was 194° F.; first-stage cooling to 72° F., and second-stage cooling to 35° F.

Run #4: 848 g water, 200 g $K_2SO_4$, 83 g $Na_2SO_4$; maximum heating temperature was 200° F.; first-stage cooling to 72° F., and second-stage cooling to 35° F.

Run #5: 863 g water, 200 g $K_2SO_4$, 68 g NaCl; maximum heating temperature was 200° F.; first-stage cooling to 71° F., and second-stage cooling to 35° F.

Run #6: 844 g water, 200 g $K_2SO_4$, 87 g KCl; maximum heating temperature was 200° F.; first-stage cooling to 72° F., and second-stage cooling to 35° F.

Run #7: 931 g water, 200 g $K_2SO_4$; maximum heating temperature was 206° F.; first-stage cooling to 71° F., and second-stage cooling to 35° F.

The following table sets forth the results of these test runs after the first-stage cooling analysis, where all percentages re on a weight basis:

TABLE 1

| Run # | K | Mg | Cl | [1]Theo. $K_2SO_4$ | [2]Actual $K_2SO_4$ | [3]$K_2O$ |
|---|---|---|---|---|---|---|
| 1 | 6.08 | — | — | 10.4 | 13.5 | 7.32 |
| 2 | 7.60 | 1.24 | — | 10.5 | 16.9 | 9.15 |
| 3 | 8.02 | 1.27 | 3.61 | 10.5 | 17.9 | 9.66 |
| 4 | 5.90 | — | — | 10.5 | 13.1 | 7.11 |
| 5 | 6.52 | — | 3.95 | 10.5 | 14.5 | 7.85 |
| 6 | 7.37 | — | 4.53 | 10.5 | 15.4 | 8.88 |
| 7 | 6.06 | — | — | 10.4 | 13.5 | 7.30 |

[1]Theoretical $K_2SO_4$ refers to the percentage of untreated $K_2SO_4$ in water solution at the selected cooling temperature of analysis.
[2]Actual $K_2SO_4$ refers to the percentage of treated $K_2SO_4$ actually in solution at the cooling temperature of analysis.
[3]$K_2O$ is a calculated value determined by the equation $K_2O = (\% K) \times (1.2046)$.

Table 2 gives the test results after second-stage cooling.

TABLE 2

| Run # | K | Mg | Cl | [1]Theo. $K_2SO_4$ | [2]Actual $K_2SO_4$ | [3]$K_2O$ | pH |
|---|---|---|---|---|---|---|---|
| 1 | 4.57 | — | — | 7.2 | 10.2 | 5.51 | 8.1 |
| 2 | 5.83 | 0.83 | — | 7.2 | 13.0 | 7.02 | 8.4 |
| 3 | 6.60 | 0.90 | 4.17 | 7.2 | 14.7 | 7.95 | 9.6 |
| 4 | 4.70 | — | — | 7.2 | 10.5 | 5.66 | 7–8 |
| 5 | 5.56 | — | 4.28 | 7.2 | 12.4 | 6.70 | 7–8 |
| 6 | 7.29 | — | 4.69 | 7.2 | 16.2 | 8.78 | 7–8 |
| 7 | 4.65 | — | — | 7.2 | 10.4 | 5.60 | 7–8 |

The foregoing data demonstrates the significant increases in $K_2SO_4$ solubility derived from the addition of surfactant and heating in accordance with the present invention. The advantageous results are particularly evident at the higher room temperatures (70°–72° F.) of Table 1.

EXAMPLE 2

In this test, a number of runs were carried out at different maximum heating temperatures, in order to determine the maximum temperature level needed to produce the highest $K_2SO_4$ solubility. In each test, identical amounts of water, Soluble Fine Potash (Great Salt Lake Minerals Corp.) and 1090 ppm Poly-Tergent 2A1-L were mixed and heated to various maximum temperatures, whereupon the mixtures were first-stage cooled with occasional stirring to 70° F., filtered and the filtrate was analyzed to determine %$K_2O$; thereafter, the solutions were second-stage cooled for 3 days in a refrigerator to 35° F., refiltered and reanalyzed for %$K_2O$ in the filtrate. These results are set forth below:

TABLE 3

| Run # | Max. Heating Temp. °F. | First-Stage Analysis % $K_2O$ | Second-Stage Analysis % $K_2O$ |
|---|---|---|---|
| 1 | 70 | 4.79 | 4.89 |
| 2 | 100 | 5.77 | 5.89 |
| 3 | 142 | 7.22 | 5.89 |
| 4 | 180 | 7.59 | 5.37 |
| 5 | 210 | 7.23 | 6.02 |

As can be seen, the best solubility results in this series of tests were obtained using a maximum heating and reaction temperature in the range of from about 130°–210° F.

EXAMPLE 3

In this example, a number of other commercially available surfactants were tested to ascertain their utility in the context of the invention. In each test run, 400 g water was mixed with an amount of a surfactant and 90 g $K_2SO_4$. Each mixture was then heated with stirring to 200° F., and thereupon cooled with stirring to 72° F. The respective samples were then filtered and analyzed to determine %$K_2O$. These results are set forth below, and should be compared with a theoretical %$K_2O$ for untreated $K_2SO_4$ at 72° F. of 5.6%.

TABLE 4

| Run # | Surfactant (ppm) | Actual % $K_2O$ |
|---|---|---|
| 1 | Astrowet 075 (1224) | 6.66 |
| 2 | Alcosperse 149 (1714) | 5.64 |
| 3 | Dowfax 2A1-1 (45%) (1306) | 8.26 |
| 4 | Desoto Desonate AOS (1449) | 7.91 |
| 5 | Acrysol LMW45NX (1224) | 6.13 |
| 6 | Cyanamid Aero 845 Promoter (1327) | 8.16 |
| 7 | Cyanamid Aero 845 Promoter (1306) | 8.03 |
| 8 | 34% Sherex 83A + 66% Cyanamid Aero 845 Promoter (1208) | 6.46 |

The surfactants of Runs #1–5 were several years old, whereas the reagents of Runs #6–8 were fresh. The surfactants of Table 4 are further identified as follows:

Astrowet 075: Sodium dioctyl sulfosuccinate (CAS #577-11-7); Alco Chemical Corp., Chattanooga, Tenn.;

Alcosperse 149: Sodium polyacrylate (CAS #9003-04-7); Alco Chemical Corp., Chattanooga, Tenn.;

Dowfax 2A1-L: Benzene 1,1-oxybis tetrapropylene derivatives/sulfonated sodium salts (CAS #119345-04-9); Dow Chemical Company, Midland, Mich.;

Desoto Desonate AOS: Now designated Witconate A08; Alkyl ($C_{14}$–$C_{16}$) olefin sulfonate sodium salt (CAS #68439-57-6); Witco Organics Division, Houston, Tex.;

Acrysol LMW45NX: Low molecular weight polyacrylic acid, 20% NaOH neutralized; Rohm & Haas Co., Philadelphia, Pa.;

Cyanamid Aero 845 Promoter: Sulfosuccinate mixture; American Cyanamid Co., Wayne, N.J.; and Sherex 83A: 1,3 propane diamine N-(3-branched tridecyloxypropyl) (CAS #68479-04-9); Sherex Chemical Co., Dublin, Ohio.

The Dowfax 2A1-1 and Cyanamid Aero 845 Promoter products gave results very similar to the surfactants used in Examples 1 and 2, whereas the remaining surfactants were less effective. In order to ascertain the degree of utility of these surfactants, they were further tested by varying the amounts of use thereof. It was determined that a concentration level of about 1000–2000 ppm of these surfactants will achieve maximum results. In another test series, it was determined that the Sherex 83A was less effective than the Cyanamid Aero 845 Promoter, and that the presence of $MgSO_4$ did increase $K_2SO_4$ solubility. This latter series of tests further demonstrated that heating was required in order to achieve increased $K_2SO_4$ solubility.

EXAMPLE 4

In this test, the solubility effect of Poly-Tergent 2A1-L on reagent grade $K_2SO_4$ with and without $MgSO_4$ was tested; also, the effect of different maximum temperatures on the cooled solutions was ascertained. In each $K_2SO_4$-only test, 100 g of reagent grade $K_2SO_4$ was mixed in 400 g of water and 1130 ppm of the Poly-Tergent 2A1-L surfactant. In the companion tests, 100 g of reagent grade $K_2SO_4$, and 70 g of $MgSO_4$ were mixed in 400 g of water with 1130 ppm of the surfactant. The respective test mixtures were then heated to different maximums, and first-stage cooled with stirring to 67°–68° F., whereupon they were filtered and the filtrate analyzed to determine $\%K_2O$. Thereafter, the mixtures were second-stage cooled in a refrigerator to 35°–40° F. for 3 days, stirred, refiltered and reanalyzed. The test results are set forth in the following tables:

TABLE 5

| | Reagent Grade $K_2SO_4$ | | | | |
|---|---|---|---|---|---|
| Run # | Max. Temp °F. | 1st-Stage Temp. °F. | % $K_2O$ | 2nd-Stage Temp. °F. | % $K_2O$ |
| 1 | 70 | 67 | 4.89 | 35 | 5.20 |
| 2 | 100 | 67 | 5.47 | 35 | 5.59 |
| 3 | 110 | 67 | 5.87 | 36 | 6.23 |
| 4 | 120 | 67 | 6.22 | 36 | 6.01 |
| 5 | 130 | 67 | 6.47 | 36 | 5.70 |
| 6 | 140 | 67 | 6.90 | 36 | 5.91 |
| 7 | 150 | 67 | 7.29 | 36 | 5.94 |
| 8 | 160 | 67 | 7.23 | 36 | 5.84 |
| 9 | 170 | 67 | 7.12 | 37 | 5.88 |
| 10 | 190 | 67 | 7.02 | 38 | 5.60 |

TABLE 6

| | Reagent Grade $K_2SO_4$ With $MgSO_4$ | | | | |
|---|---|---|---|---|---|
| Run # | Max. Temp °F. | 1st-Stage Temp. °F. | % $K_2O$ | 2nd-Stage Temp. °F. | % $K_2O$ |
| 1 | 78 | 67 | 6.16 | 41 | 6.11 |
| 2 | 100 | 67 | 6.35 | 39 | 6.41 |
| 3 | 110 | 67 | 6.64 | 39 | 6.52 |
| 4 | 120 | 67 | 6.94 | 40 | 7.05 |
| 5 | 130 | 67 | 7.47 | 38 | 7.65 |
| 6 | 140 | 67 | 8.02 | 38 | 8.02 |
| 7 | 150 | 67 | 8.87 | 40 | 7.83 |
| 8 | 160 | 67 | 9.12 | 38 | 7.66 |
| 9 | 170 | 67 | 9.32 | 38 | 7.54 |
| 10 | 190 | 67 | 8.97 | 40 | 7.52 |

The theoretical $\%K_2O$ values for Table 5 are 5.4% at 67° F. and 4.0% at 36° F.; for Table 6, they are 5.4% at 67° F. and 4.1% at 39° F.

EXAMPLE 5

In this test, a number of samples of reagent grade $K_2SO_4$ were tested with varying amounts of the Poly-Tergent 2A1-L surfactant. The respective test procedures are set forth below:

Run #1: 0.71 g of the surfactant was mixed with 800 g water, and 200 g reagent grade $K_2SO_4$. The mixture was heated with stirring to 150° F., whereupon it was first-stage cooled with stirring to 73° F., filtered, analyzed, and second-stage cooled to 37° F., refiltered and further analyzed.

Run #2: 200 g reagent grade $K_2SO_4$ was mixed with 800 g water and heated to 162° F. with stirring. After 5 minutes at 162° F., 0.72 g of the Poly-Tergent 2A1-L surfactant were added, whereupon the mixture was cooled with stirring to 73° F., filtered and analyzed.

Run #3: 0.44 g of the 2A1-L surfactant were mixed with 400 g of water and 100 g of reagent grade $K_2SO_4$. The mixture was heated with stirring to 160° F., held for 5 minutes at that temperature and cooled with stirring to 73° F. The mixture was then filtered and the filtrate was analyzed.

Run #4: 0.32 g of the 2A1-L surfactant were mixed with 400 g water and 100 g of reagent grade $K_2SO_4$. The mixture was heated with stirring to 156° F., held at that temperature for 5 minutes, and cooled overnight with occasional stirring to 73° F. The mixture was then filtered and the filtrate analyzed.

The following table sets forth the results of these tests.

TABLE 7

| Run # | Surfactant ppm | % $K_2O$ (Temp. °F.) |
|---|---|---|
| 1 | 888 | 7.5 (73)/5.5 (37) |
| 2 | 900 | 7.2 (73) |
| 3 | 1100 | 7.6 (73) |
| 4 | 800 | 7.5 (73) |

EXAMPLE 6

In this study, reaction conditions and surfactant amounts were optimized for the production of $K_2SO_4$ solutions having $\%K_2O$ values above 8%. In the first aspect of this study, a temperature/solubility profile was completed using a series of samples prepared at a level of 0.5% surfactant based upon the weight of potassium sulfate. Specifically, in each test sample, 45 g of $K_2SO_4$ were mixed in 200 ml of water, and sufficient surfactant was added to achieve the 0.5% by weight level, based upon the weight of the $K_2SO_4$. The surfactants used were the Poly-Tergent 3B2 and 2A1-L material described above. The respective solutions were heated with stirring to temperatures of 68° F. and between 80°–150° F. in increments of 10° F. After the final selected reaction temperature was reached, the solutions were cooled to 68° F. in a cold water bath, with stirring. Thereafter, the solutions were filtered and analyzed by atomic absorption spectroscopy.

The results of this study are set forth in the following table.

TABLE 8

| Reaction Temp (F.) | POLY-TERGENT 2A1-L % $K_2O$ (Wt.) | POLY-TERGENT 3B2 % $K_2O$ (Wt.) |
|---|---|---|
| 68 | 5.7 | 5.9 |
| 80 | 6.4 | 6.9 |
| 90 | 7.2 | 7.7 |
| 100 | 7.4 | 8.2 |
| 110 | 8.1 | 8.5 |
| 120 | 8.6 | 8.8 |
| 130 | 8.7 | 8.7 |
| 140 | 8.6 | 8.5 |
| 150 | 8.6 | 8.4 |

Both of the test surfactants gave $\%K_2O$ values greater than 8% at 110° F. In several instances, the 3B2 surfactant appeared to give higher percent solubility as compared with the 2A1-L material at the same temperatures, especially between 80°–120° F. Using this data, a reaction temperature of 110° F. was selected for continued work, and all solutions were retained to evaluate stability of the soluble potassium sulfate.

In another aspect of this study, a second set of samples was analyzed for %K$_2$O using various surfactant concentrations and a maximum reaction temperature of 110° F. with subsequent cooling, filtering and analysis at 68° F. Each sample again was made up of 45 g K$_2$SO$_4$, 200 ml of water and 3B2 and 2A1-L surfactant concentrations ranging from 0.05–0.5% by weight, based upon the weight of K$_2$SO$_4$, in increments of 0.05 weight percent. It was determined that the 3B2 surfactant gives approximately 8.5% K$_2$O at 0.3–0.5% by weight surfactant, and the 2A1-L material gave approximately the same performance. These samples wee also retained for stability studies.

In a final aspect of this test, filtrate samples from the temperature/solubility profile and concentration/solubility profile tests were stored at room temperature (about 68°–72° F.). The temperature study samples were all slightly cloudy after filtering the undissolved sulfate. In 24 hours, the turbidity had settled to the bottom of the sample bottles, resembling a thin layer of brown dust, while the samples were clear. Solutions prepared at temperatures up to 120° F. were the same after 7 days. Solutions heated to 130° F. and higher developed a very small amount of white crystalline precipitate in addition to the brown precipitate. The samples prepared at 100° F. and 110° F. exhibited good stability with only a very small amount of brown precipitate on the false bottoms.

The concentration study samples were initially similar to the temperature study samples, except for the blank which was clear. A brown precipitate formed after settling overnight as well. Samples containing 0.15% by weight surfactant and lower amounts began to precipitate white crystalline sulfate as well as increasing amounts of brown precipitate after 3 days. After 6 days, all samples at and below 2.5% by weight surfactant had the same precipitate, with the blank showing traces of down material. The samples at 0.3% and higher surfactant showed some small increases in amounts of brown precipitate.

Based upon this study, it was determined that to obtain minimum 8% K$_2$O solution, the surfactant should be present at a level of from about 0.3–0.5% by weight, based upon the weight of the K$_2$SO$_4$. Moreover, the maximum reaction temperature should be on the order of 100°–160° F., most preferably about 110° F. for reasons of speed an ease of reaction.

FIG. 1 illustrates in graphical form the effect of the surfactant/heating treatment of the invention as determined by this series of test. The untreated/unheated bar represents the solubility of straight K$_2$SO$_4$ in water, which is about 5.7% taken as K$_2$O. The second bar, untreated/heated, illustrates that simply heating a solution of K$_2$SO$_4$ to a reaction temperature in accordance with the invention does not enhance salt solubility. Likewise, treatment of the K$_2$SO$_4$ with surfactant without heating has no appreciable effect. However, the last bar (treated/heated), demonstrates that the combined effect of surfactant and heating markedly increases K$_2$SO$_4$ solubility in water.

We claim:

1. A potassium sulfate salt product having enhanced water solubility and consisting essentially dry potassium sulfate salt having applied onto the surface thereof a surfactant for increasing the solubility of the potassium sulfate in water, together with a minor amount of a magnesium ion source selected from the group consisting of sources of magnesium chloride, magnesium sulfate, and mixtures thereof, said surfactant being present at a level of at least about 0.1% by weight, based upon the weight of said dry potassium sulfate salt, said product, when mixed with sufficient water to form a solution and heated, having a potassium sulfate solubility calculated as K$_2$O of at least about 8%.

2. The product of claim 1, said surfactant being present at a level of from about 0.30–0.50% by weight.

3. The product of claim 1, said surfactant being selected from the group consisting of disulfonate and oxyalkylated alcohol-carboxylic acid adduct surfactants.

4. The product of claim 3, said surfactant comprising a surfactant selected from the group consisting of the alkyl diphenyl ether disulfonates.

5. The product of claim 4, wherein the alkyl group of said disulfonate contains from about 8–22 carbon atoms.

6. The product of claim 5, wherein said alkyl group contains from about 10–18 carbon atoms.

7. The product of claim 5, wherein the alkyl group of said disulfonate is linear.

8. The product of claim 3, said oxyalkylated alcohol-carboxylic acid adduct surfactant being selected from the group consisting of surfactants having the general formula

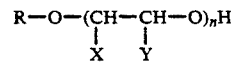

wherein R is a C$_8$–C$_{22}$ hydrophobe, X and Y are individually selected from the group consisting of H, CH$_3$ and a succinic acid radical, and n ranges from about 1–8.

9. An aqueous potassium sulfate salt solution comprising water, dissolved potassium sulfate and a surfactant for increasing the solubility of said dissolved sulfate, said surfactant being present at a level of at least about 0.1% by weight, based upon the weight of said potassium sulfate said water being present in an amount by weight greater than the weight amounts of said potassium sulfate and surfactant, the potassium salt fraction of said solution consisting essentially of potassium sulfate, said potassium sulfate solution having a potassium sulfate solubility calculated as K$_2$O of at least about 8%.

10. The product of claim 9, said surfactant being present at a level of from about 0.3–0.5% by weight.

11. The product of claim 9, said surfactant being selected from the group consisting of disulfonate and oxyalkylated alcohol-carboxylic acid adduct surfactant.

12. The product of claim 11, said surfactant comprising a surfactant selected from the group consisting of the alkyl diphenyl ether disulfonates.

13. The product of claim 12, wherein the alkyl group of said disulfonate contains from about 8–22 carbon atoms.

14. The product of claim 13, wherein said alkyl group contains from about 10–18 carbon atoms.

15. The product of claim 12, wherein the alkyl group of said disulfonate is linear.

16. The product of claim 12, said oxyalkylated alcohol-carboxylic acid adduct surfactant being selected from the group consisting of surfactants having the general formula

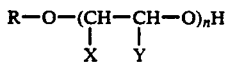

wherein R is a $C_8$–$C_{22}$ hydrophobe, X and Y are individually selected from the group consisting of H, $CH_3$ and a succinic acid radical, and n ranges from about 1–8.

17. The product of claim 9, further including an amount of $MgSO_4$.

18. A method of increasing the solubility of potassium sulfate in water, comprising the steps of heating a mixture including water, a quantity of potassium sulfate slat, and at leas about 0.1% by weight surfactant, based upon the weight of said potassium sulfate salt, to a temperature of from about 100°–210° F. for increasing the solubility of said potassium sulfate in said water, said water being present in an amount by weight greater than the weight amounts of said potassium sulfate and surfactant, the potassium salt fraction of said mixture consisting essentially of potassium sulfate, said potassium sulfate mixture having a potassium sulfate solubility calculated as $K_2O$ of at least about 8%.

19. The method of claim 18, including the step of heating said mixture with agitation.

20. The method of claim 18, including the step of cooling said mixture after said heating thereof to approximately ambient temperature.

21. The method of claim 20, said surfactant being present at a level of from about 0.30–0.50% by weight.

22. The method of claim 18, said surfactant being selected from the group consisting of disulfonate and oxyalkylated alcohol-carboxylic acid adduct surfactants.

23. The method of claim 22, said surfactant comprising a surfactant selected from the group consisting of the alkyl diphenyl ether disulfonates.

24. The method of claim 23, wherein the alkyl group of said disulfonate contains from about 8–22 carbon atoms.

25. The method of claim 24, wherein said alkyl group contains from about 10–18 carbon atoms.

26. The method of claim 24, wherein the alkyl group of said disulfonate is linear.

27. The method of claim 18, including the step of first mixing together said water, potassium sulfate, and surfactant, and thereafter heating said mixture.

28. The method of claim 23, said oxyalkylated alcohol-carboxylic acid adduct surfactant being selected from the group consisting of surfactants having the general formula

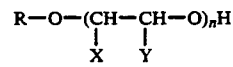

wherein R is a $C_8$–$C_{22}$ hydrophobe, X and Y are individually selected from the group consisting of H, $CH_3$ and a succinic acid radical, and n ranges from about 1–8.

29. The method of claim 18, further including the step of adding an amount of a magnesium ion source selected from the group consisting of sources of $MgCl_2$, $MgSO_4$ and mixtures thereof to said mixture.

* * * * *